US012305426B2

(12) United States Patent
Lien

(10) Patent No.: US 12,305,426 B2
(45) Date of Patent: May 20, 2025

(54) ELECTRONIC CABINET LOCK

(71) Applicant: WAFERLOCK Corp., Taichung (TW)

(72) Inventor: Chih-Min Lien, Taichung (TW)

(73) Assignee: WAFERLOCK Corp., Taichung (TW)

( * ) Notice: Subject to any disclaimer, the term of this patent is extended or adjusted under 35 U.S.C. 154(b) by 170 days.

(21) Appl. No.: 18/449,353

(22) Filed: Aug. 14, 2023

(65) Prior Publication Data

US 2024/0401377 A1 Dec. 5, 2024

(30) Foreign Application Priority Data

May 29, 2023 (TW) ................................ 112119902

(51) Int. Cl.

*E05B 47/06* (2006.01)
*E05B 5/00* (2006.01)
*E05B 5/02* (2006.01)
*E05B 13/00* (2006.01)
*E05B 47/00* (2006.01)

(52) U.S. Cl.

CPC .......... *E05B 47/0657* (2013.01); *E05B 5/003* (2013.01); *E05B 13/002* (2013.01); *E05B 47/0012* (2013.01); *E05B 47/0046* (2013.01); *E05B 2047/0086* (2013.01)

(58) Field of Classification Search

CPC . E05B 5/00; E05B 5/003; E05B 5/006; E05B 47/0012; E05B 47/0046; E05B 47/0657; E05B 2047/0084; E05B 2047/0085; E05B 2047/0086; E05B 7/00; E05B 13/00; E05B 13/002; E05B 13/004; E05B 13/10; E05B 65/006; E05C 3/041; E05C 3/042

See application file for complete search history.

(56) References Cited

FOREIGN PATENT DOCUMENTS

| | | | |
|---|---|---|---|
| CN | 108150020 A * | 6/2018 | ......... E05B 47/0657 |
| CN | 108756497 A * | 11/2018 | ......... E05B 47/0012 |
| CN | 109826502 A * | 5/2019 | |

(Continued)

OTHER PUBLICATIONS

Office Action, which was issued to Taiwanese counterpart application No. 112119902 by the TIPO on Nov. 16, 2023, with an English translation thereof.

*Primary Examiner* — Christine M Mills
*Assistant Examiner* — Peter H Watson
(74) *Attorney, Agent, or Firm* — Burris Law, PLLC

(57) ABSTRACT

An electronic cabinet lock includes a handgrip pivotably connected with a housing unit, a swingable member swingably disposed on the handgrip, and first and second magnet members disposed on the handgrip and the swingable member and constantly attractive with each other. A latch member is controlled by a control unit to move in the up-down direction to be disposed forwardly of and abut against an upper end of the swingable member. A lock cylinder unit is disposed below the handgrip and includes a lock tongue movable in the up-down direction to be disposed forwardly of and abut against a lower end of the swingable member. During swinging of the swingable member where the swingable member is in abutting engagement with the latch member or the lock tongue, with the magnet members, the swingable member is moved back to render the swingable member well functioning after long term use.

10 Claims, 10 Drawing Sheets

(56) References Cited

FOREIGN PATENT DOCUMENTS

| | | | | | |
|---|---|---|---|---|---|
| CN | 113137145 | | | 7/2021 | |
| CN | 113137145 | A | | 7/2021 | |
| DE | 202014003440 | U1 | * | 9/2015 | ........... E05B 1/0092 |
| EP | 3511494 | A1 | * | 7/2019 | ......... A45C 13/1069 |
| GB | 2425327 | A | * | 10/2006 | ............. E05B 13/10 |
| KR | 101290535 | B1 | * | 7/2013 | |
| TW | 1663316 | B | | 6/2019 | |
| TW | 1763369 | B | | 5/2022 | |

* cited by examiner

ELECTRONIC CABINET LOCK

CROSS-REFERENCE TO RELATED APPLICATION

This application claims priority to Taiwanese Patent Application No. 112119902, filed on May 29, 2023.

FIELD

The disclosure relates to a cabinet lock, and more particularly to an electronic cabinet lock unlocked using a key or an electronic locking system.

BACKGROUND

Most existing cabinet locks are unlocked using a physical key. However, a user of the cabinet lock will be inconvenienced if the key were to be lost. Additionally, physical lock and keys do not allow record keeping of access time and access personnel identity which is inconducive for data collection and access control management.

Therefore, with reference to FIG. 1, a cabinet lock 9 as disclosed in CN113137145 is unlockable with a key or an electronic locking system. The cabinet lock 9 includes a mounting seat 91, a handgrip 92 rotatably disposed on the mounting seat 91, a torsion spring 93 disposed between the mounting seat 91 and the handgrip 92, a Bluetooth module (not shown) disposed within the mounting seat 91, and an electromagnetic lock 94 disposed on the mounting seat 91 and in signal connection with the Bluetooth module. A holding seat 921 is disposed on the handgrip 92 for a lock cylinder 922 to be mounted thereon, and has an insert slot 924 such that an output shaft 942 of the electromagnetic lock 94 is downwardly inserted into the insert slot 924. A latch plate 923 is movably disposed rearwardly of the lock cylinder 922 to be driven by the lock cylinder 922 to move in an up-down direction.

During unlocking with the electronic locking system, an electronic device such as a smart phone, in signal connection with the Bluetooth module is used to control actuation of the electromagnetic lock 94, the output shaft 942 is moved upwardly while a compression spring 944 is compressed. Once the output shaft 942 is removed from the insert slot 924, the handgrip 93 is rotated away from the mounting seat 91 by virtue of the biasing action of the torsion spring 93, and the output shaft 942 is moved downwardly by virtue of the biasing action of a compression spring 944. When carrying out a locking operation, the handgrip 92 is pressed toward the mounting seat 91. The output shaft 942 abuts against the latch plate 923 and is moved upwardly to compress the compression spring 944. Subsequently, the output shaft 942 is moved over the latch plate 923 until it reaches above the insert slot 924. At this time, the output shaft 942 is moved downwardly to be inserted into the insert slot 924 by the compression spring 944.

During unlocking with a key, through a key actuated rotation of the lock cylinder 922, the latch plate 923 is moved downwardly, and the output shaft 942 is removed from the latch plate 923 so that the handgrip 92 is released to be rotated away from the mounting seat 91 by virtue of the biasing action of the torsion spring 93. When carrying out a locking operation, the handgrip 92 is pressed toward the mounting seat 91 to bring the output shaft 942 into the insert slot 924. Subsequently, the key is turned to move the latch plate 923 upwardly back to abut against the output shaft 942.

However, the compression spring 944 may be deformed due to elastic fatigue after long-term use and the output shaft 942 may not be biased to move downwardly anymore, which may result in the latching of the output shaft 942 in the insert slot 924 to become unstable. Moreover, during unlocking and locking operations, the output shaft 942 frictionally contacts the holding seat 921 and the latch plate 923, which causes abrasion and damage to the electromagnetic lock 94. Furthermore, during the locking operation using the key, the user must grip the handgrip 92 to abut against the mounting seat 91 with one hand against the biasing action of the torsion spring 93, and rotate the key with the other hand to move the latch plate 923 upwardly, which renders the operation inconvenient.

SUMMARY

Therefore, an object of the disclosure is to provide an electronic cabinet lock that can alleviate at least one of the drawbacks of the prior art.

According to the disclosure, the electronic cabinet lock includes a housing unit, a handle unit, a clutch unit, a control unit and a lock cylinder unit. The housing unit includes a mounting housing which has an accommodation slot, and a rotating axle which is rotatably mounted on the mounting housing. The handle unit includes a handgrip which has an end that is pivotably connected with the rotating axle and which is removably disposed in the accommodation slot, a torsion spring which is disposed between the handgrip and the rotating axle, a swingable member which is swingably disposed on an opposite end of the handgrip that is opposite to the rotating axle, a first magnet member which is disposed on the opposite end of the handgrip adjacent to the swingable member, and a second magnet member which is disposed on the swingable member and which is constantly attractive with the first magnet member. The torsion spring is disposed to bias the handgrip away from the accommodation slot. The swingable member has an upper end and a lower end opposite to each other in an up-down direction. The clutch unit is disposed within the mounting housing, and includes a latch member which is actuated to move in the up-down direction. The latch member is disposed forwardly of the upper end of the swingable member in a front-rear direction that is transverse to the up-down direction to abut against the upper end of the swingable member when the latch member is in a lower position. The control unit is disposed on the handgrip and operable to control movement of the latch member in the up-down direction. The lock cylinder unit is disposed in the accommodation slot and below the handgrip. The lock cylinder unit includes a lock tongue which is movable in the up-down direction, and a key cylinder which is operable to move the lock tongue in the up-down direction. The lock tongue is disposed forwardly of the lower end of the swingable member to abut against the lower end of the swingable member when the lock tongue is in an upper position. The key cylinder has a key hole.

In locking and unlocking operations of the electronic cabinet lock, during swinging of the swingable member where the swingable member is in abutting engagement with either the latch member or the lock tongue, with the second magnet member magnetically attractive with the first magnet member, the swingable member can be moved back to its original position so as to render the swingable member well functioning after long term use. Moreover, in the locking operation, the user can press the handgrip to the accommodation slot with one hand to bring the swingable member in abutting engagement with the rear sides of the latch member and the lock tongue, which is convenient to conduct.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
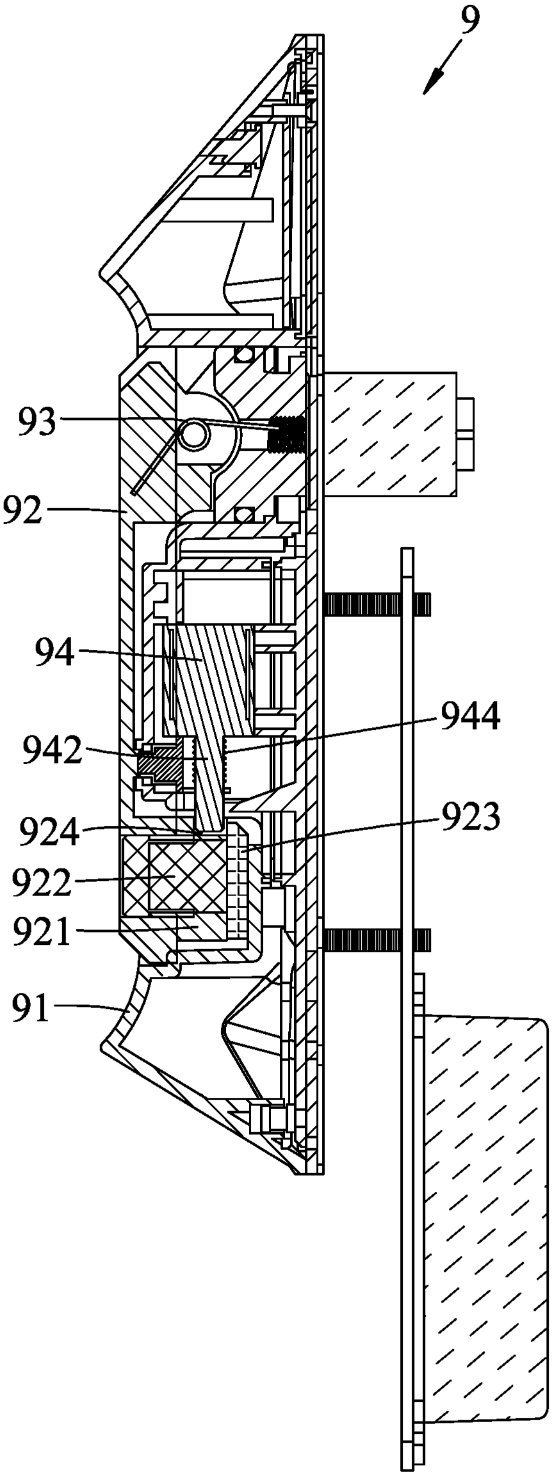
FIG.1 PRIOR ART
FIG. 1 is a sectional view of a conventional electronic cabinet lock.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
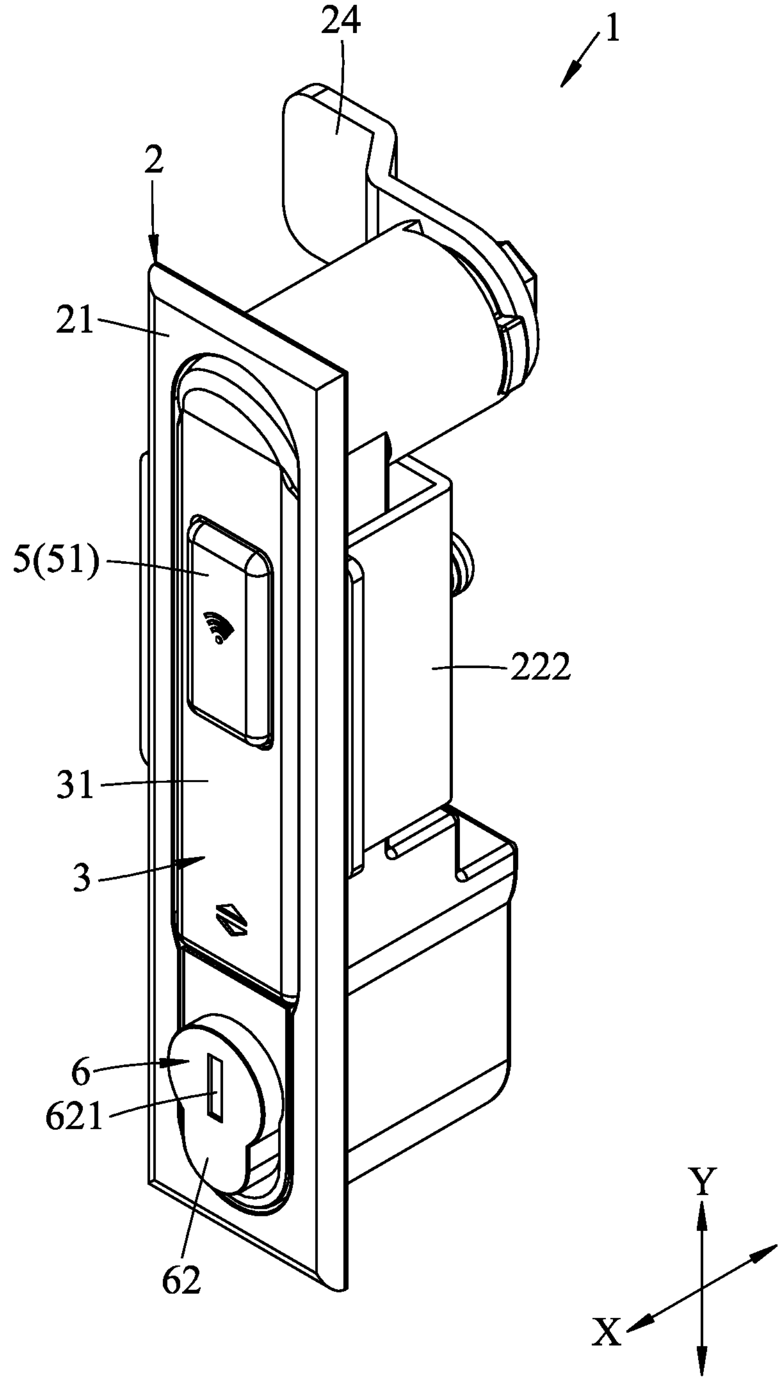
FIG. 2 is a perspective view illustrating an embodiment of an electronic cabinet lock according to the disclosure.
Figure 3:
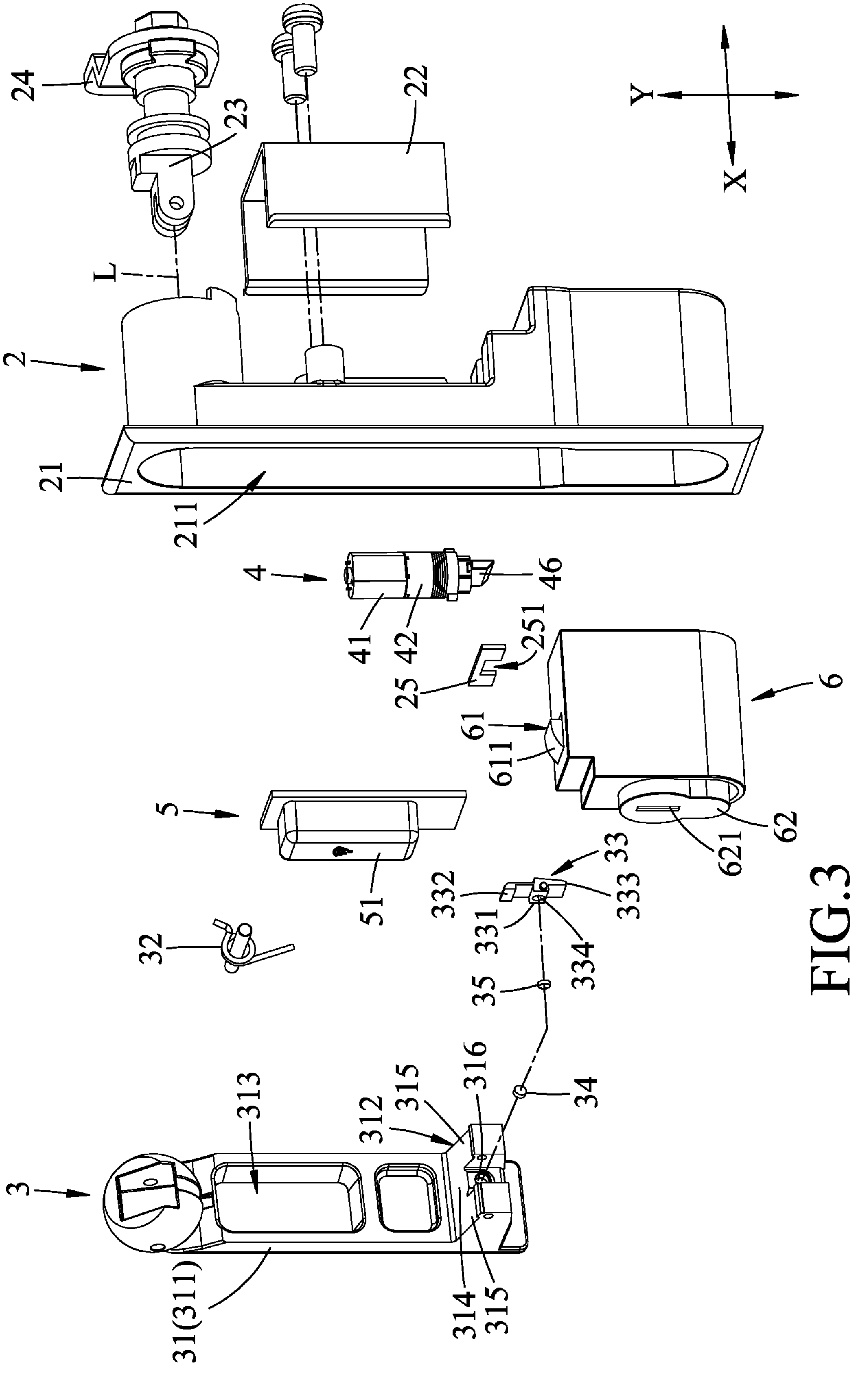
FIG. 3 is an exploded perspective view of the embodiment.
Figure 4:
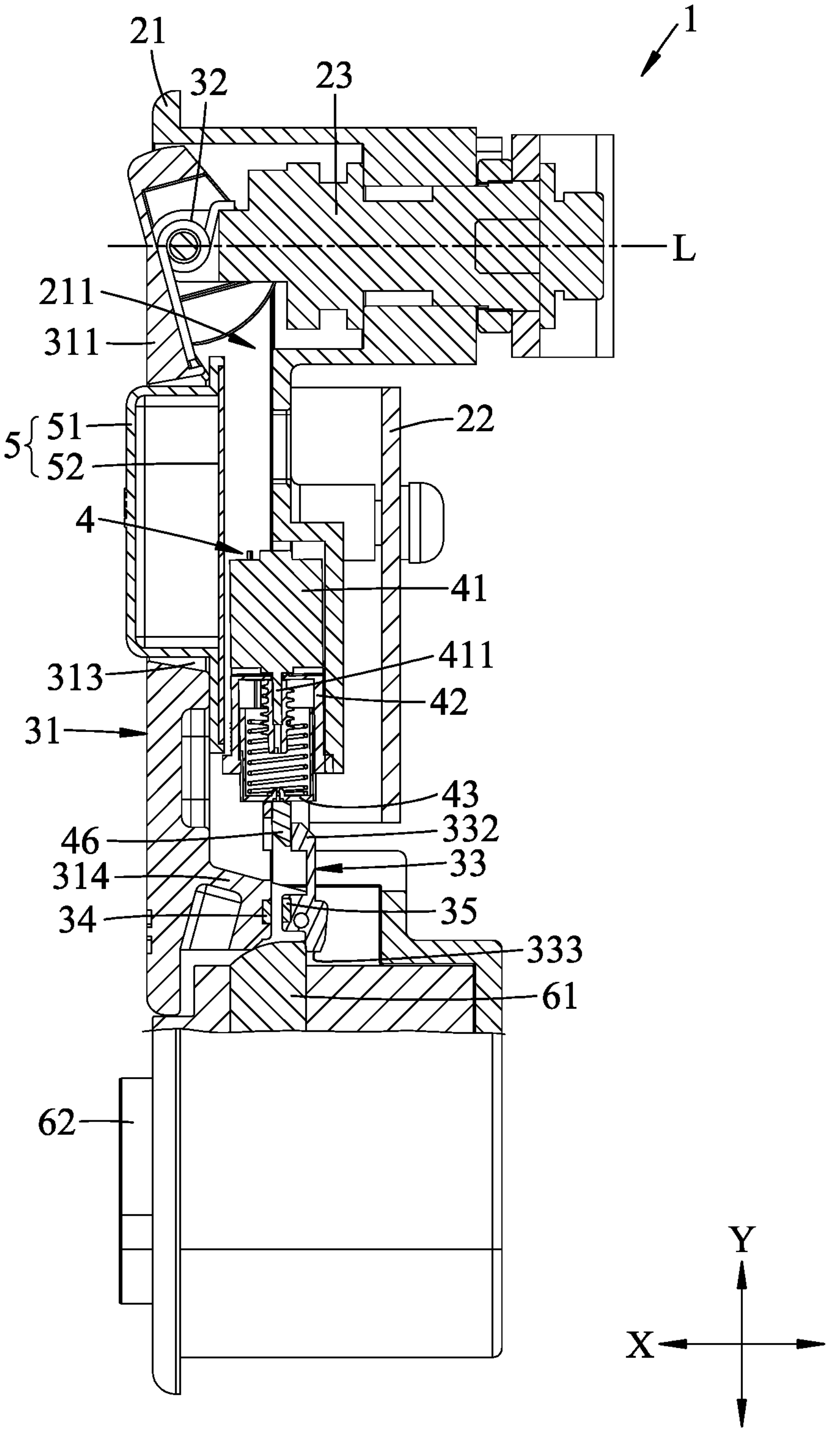
FIG. 4 is a partly-sectional view of the embodiment in a locking state.

Referring to FIGS. 2 to 4, an embodiment of an electronic cabinet lock 1 according to the disclosure is adapted to be mounted on a door panel (not shown) of a cabinet (not shown). The electronic cabinet lock 1 is unlocked using an electronic locking system through an IC card (not shown) or a wireless remote control device, or a mechanical system through a key (not shown). The electronic cabinet lock 1 includes a housing unit 2, a handle unit 3, a clutch unit 4, a control unit 5 and a lock cylinder unit 6.

The housing unit 2 includes a mounting housing 21 which is mounted on a front side of the door panel in a front-rear direction (X), a back plate 22 which is mounted on a rear side of the door panel and securely coupled with the mounting housing 21, a rotating axle 23 which is rotatably mounted on the mounting housing 21 about a rotating axis (L) parallel to the front-rear direction (X), a locking plate 24 which is disposed on and synchronously rotated with the rotating axle 23, and a press plate 25 which is disposed within the mounting housing 21 adjacent to the clutch unit 4. The mounting housing 21 has an accommodation slot 211 which extends in an up-down direction (Y) that is transverse to the front-rear direction (X). The press plate 25 has a notch 251 which is opened downwardly. The locking plate 24 is brought to be retained with the cabinet to retain the door panel to the cabinet.

The handle unit 3 includes a handgrip 31 which has an end that is pivotably connected with the rotating axle 23 and which is removably disposed in the accommodation slot 211, a torsion spring 32 which is disposed between the handgrip 31 and the rotating axle 23, a swingable member 33 which is swingably disposed on an opposite end of the handgrip 31 that is opposite to the rotating axle 23 in the up-down direction (Y), a first magnet member 34 which is disposed on the opposite end of the handgrip 31 adjacent to the swingable member 33, and a second magnet member 35 which is disposed on the swingable member 33 and which is constantly attractive with the first magnet member 34. The torsion spring 32 is disposed to bias the handgrip 31 away from the accommodation slot 11.

Specifically, the handgrip 31 has a handgrip plate 311 which is the end pivotably connected with the rotating axle 23 and which extends in the up-down direction (Y), a protrusion 312 which extends rearwardly from the opposite end away from the rotating axle 23, and a penetrating slot 313 which extends through the handgrip plate 311 in the front-rear direction (X). The protrusion 312 has a central portion 314 and two lugs 315 which protrude rearwardly from both sides of the central portion 314. The central portion 314 has a first mounting slot 316 which is opened rearwardly and in which the first magnet member 34 is embedded. The swingable member 33 is pivotably connected with the lugs 315.

Figure 5:
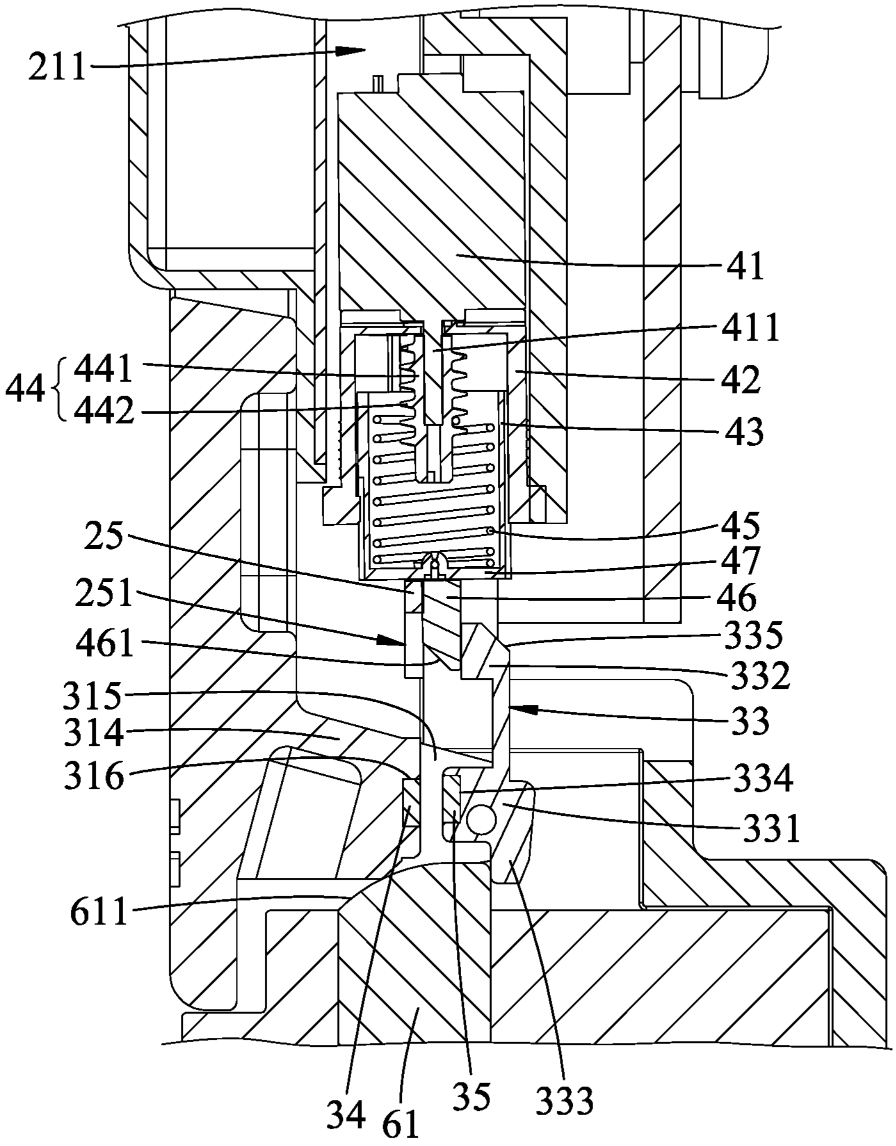
FIG. 5 is a fragmentary, enlarged view of FIG. 4.

With reference to FIGS. 3 to 5, the swingable member 33 has a pivot portion 331 which is pivotably connected with the handgrip 31 about a pivot axis in the front-rear direction (X), an upper arm portion 332 which extends upwardly from the pivot portion 331 to have an upper end, and a lower arm portion 333 which extends downwardly from the pivot portion 331 to have a lower end such that the upper arm portion 332 and the lower arm portion 333 are swingable relative to the handgrip 31 about the pivot axis. The pivot portion 331 is interposed between and pivotably connected with the lugs 315, and has a second mounting slot 334 which is opened toward and faces the first mounting slot 316 and in which the second magnet member 35 is embedded. The upper arm portion 332 has a first inclined surface 335 which is formed at a rear side thereof and which is inclined relative to the up-down direction (Y).

The clutch unit 4 is disposed within the mounting housing 21, and includes a driver 41 which is controlled and actuated by the control unit 5, an outer tubular wall 42 which is disposed below the driver 41, an inner tubular wall 43 which is slidably disposed within the outer tubular wall 42 in the up-down direction (Y), a bottom wall 47 which is disposed on a bottom end of the inner tubular wall 43, a worm gear 44 which is disposed within the inner tubular wall 42 and which is actuated by and rotated with the driver 41, a biasing member 45 which is connected between the bottom wall 47 and the worm gear 44, and a latch member 46 which is connected with and extends downwardly from the bottom wall 47 to be moved with the inner tubular wall 43 in the up-down direction (Y) and which is disposed rearwardly of and abuts against the press plate 25. Specifically, the driver 41 is in the form of a motor, and has an output shaft 411. The worm gear 44 is coupled and coaxially rotated with the output shaft 411 and has a shaft portion 441 which is engaged with the output shaft 411, and a thread portion 442 which is formed around the shaft portion 441. The biasing member is in the form of a coil spring and has an upper spring end which is slidably disposed on the thread portion, and a lower spring end which is securely disposed on the bottom wall 47. The latch member 46 has a second inclined surface 461 which is formed at a front side thereof and inclined relative to the up-down direction (Y) to face and abut against the first inclined surface 335 of the upper arm portion 332.

Figure 6:
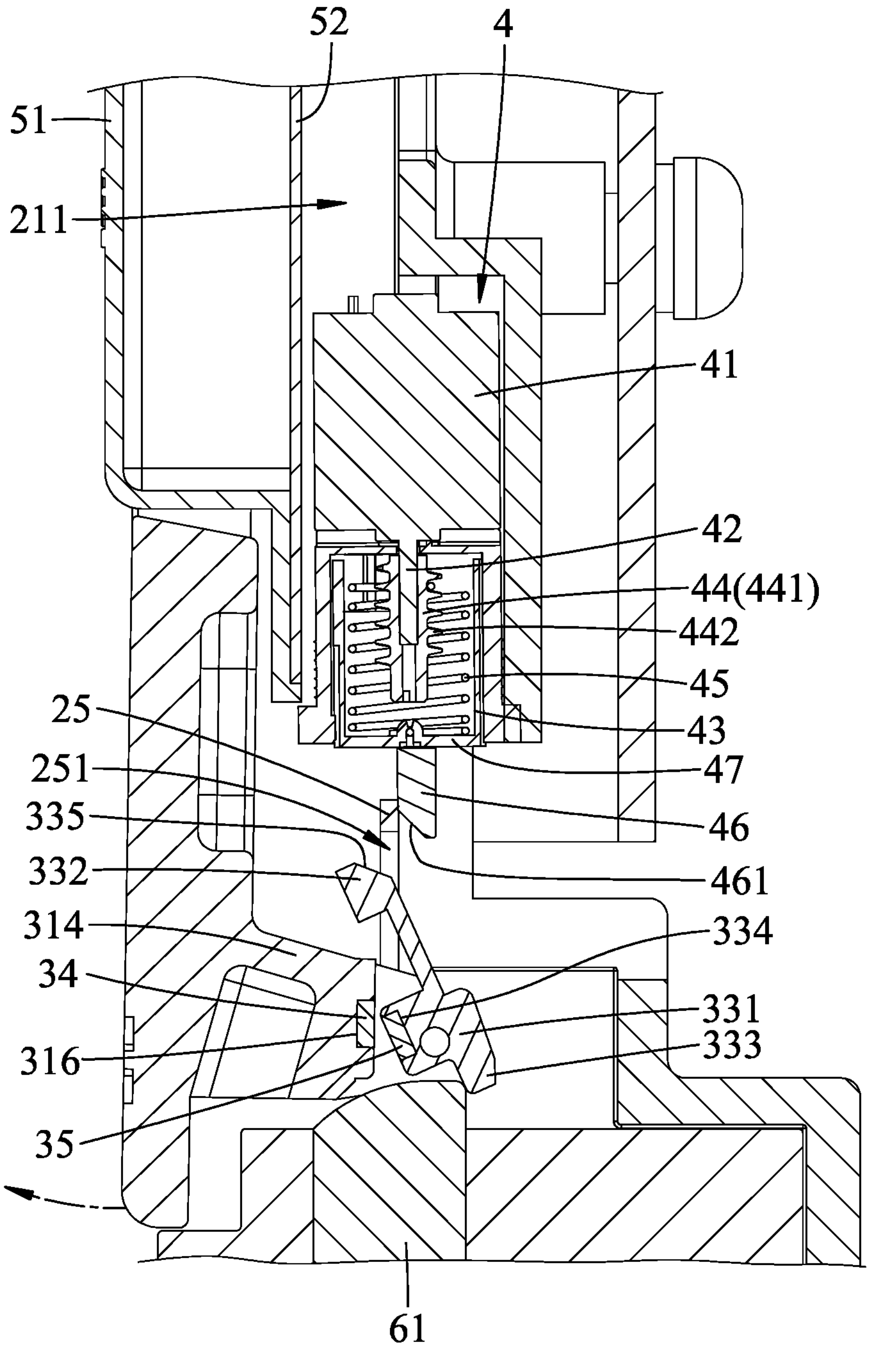
FIG. 6 is a fragmentary sectional view illustrating the embodiment during an electronically unlocking operation.

With reference to FIGS. 5 and 6, when the worm gear 44 is actuated by the output shaft 411 of the driver 41 to rotate clockwise, the upper spring end of the biasing member 45 is moved upwardly along the thread portion 442 and the lower spring end of the biasing member 45 is pulled upwardly to move the inner tubular wall 43 so as to move the latch member 46 upwardly. When the worm gear 44 is actuated by the output shaft 411 to rotate counterclockwise, the upper spring end of the biasing member 45 is moved downwardly along the thread portion 442 and the lower spring end of the biasing member 45 is pressed downwardly to move the inner tubular wall 43 so as to move the latch member 46 downwardly. Thus, with the rotation of the output shaft 411 of the driver 41, the latch member 46 is controlled and actuated to move in the up-down direction (Y).

The control unit 5 is disposed on the handgrip 31 and is operable to control the movement of the latch member 46 in the up-down direction (Y). Specifically, the control unit 5 includes an inductive sensor member 51 which is disposed in the penetrating slot 313, and a circuit board 52 which is electrically connected with the inductive sensor member 51 to control the rotation of the output shaft 411 of the driver 41 so as to control the movement of the latch member 46 in the up-down direction (Y). The inductive sensor member 51 is disposed to sense and receive an identification data of an IC card, and send an unlocking command to the circuit board 52. The circuit board 52 hence controls and actuates the clockwise rotation of the output shaft 411 of the driver 41.

In this embodiment, the communication between the inductive sensor member 51 and the IC card utilizes a Radio-frequency Identification (RFID). Moreover, an operator can transmit an unlocking signal to the inductive sensor member 51 through a mobile device, such as a smart phone, via wireless communication using Bluetooth technology, such that the inductive sensor member 51 sends an unlocking command to the circuit board 52 to control and actuate the clockwise rotation of the output shaft 411 of the driver 41.

The lock cylinder unit 6 is disposed in the accommodation slot 211 and below the handgrip 31. The lock cylinder unit 6 includes a lock tongue 61 which is movable in the up-down direction (Y), and a key cylinder 62 which is operable to move the lock tongue 61 in the up-down direction (Y). The lock tongue 61 is constantly biased to move upwardly, and has a third inclined surface 611 which is formed at a front side thereof and inclined relative to the up-down direction (Y). The key cylinder 62 has a key hole 621 for a key (not shown) to be inserted into the key hole 621 and to be rotated to perform an unlocking operation of the key cylinder 62. The key cylinder 62 is unlocked and pressed rearwardly to bring the lock tongue 61 to move downwardly. The key cylinder 62 is returned forwardly when a rearward pressing force is released. In other words, when the key cylinder 62 is locked, the key cylinder 62 cannot be moved rearwardly while the lock tongue 61 can be moved downwardly. Since the lock cylinder unit 6 has a known structure, a detailed description thereof will not be provided herein.

The electronic cabinet lock 1 is shiftable between a locking state and an unlocking state.

With reference to FIGS. 2, 4 and 5, in the locking state, the handgrip 31 is disposed in the accommodation slot 211, the latch member 46 is in a lower position, the upper arm portion 332 of the swingable member 33 is disposed rearwardly of and abuts against the latch member 46 and the lower arm portion 333 of the swingable member 33 is disposed rearwardly of and abuts against the lock tongue 61 which is in a lower position. At this stage, with the biasing action of the torsion spring 32, the opposite end of the handgrip plate 311 is biased to be moved away from the accommodation slot 211 such that the upper arm portion 332 and the lower arm portion 333 of the swingable member 33 tightly and forwardly abut against the latch member 46 and the lock tongue 61, respectively, so as to tightly retain the latch member 46 between the press plate 25 and the upper arm portion 332.

With reference to FIG. 6, when the electronic cabinet lock 1 is unlocked using an electronic locking system, the operator uses an IC card (not shown) to carry out induction of the inductive sensor member 51, or operates a smart phone (not shown) transmitting an unlocking signal to the inductive sensor member 51. The inductive sensor member 51 sends an unlocking command to the circuit board 52 to control and actuate the clockwise rotation of the output shaft 411 of the driver 41 so as to move the latch member 46 upwardly. At this stage, the upper arm portion 332 of the swingable member 33 is disengaged from the latch member 46, and the handgrip 31 is rotated forwardly by virtue of the biasing action of the torsion spring 32 (see FIG. 4) to be removed from the accommodation slot 211. During the forward rotation of the handgrip 31 from the accommodation slot 211, the lower arm portion 333 of the swingable member 33 is retained by the lock tongue 61 to permit the upper arm portion 332 to swing forwardly and pass through the notch 251 of the press plate 25 until the lower arm portion 333 is disengaged from the lock tongue 61. Subsequently, with the magnetic attraction of the second magnet member 35 on the pivot portion 331 with the first magnet member 34, the upper arm portion 332 is swung rearwardly back to its original position.

Figure 7:
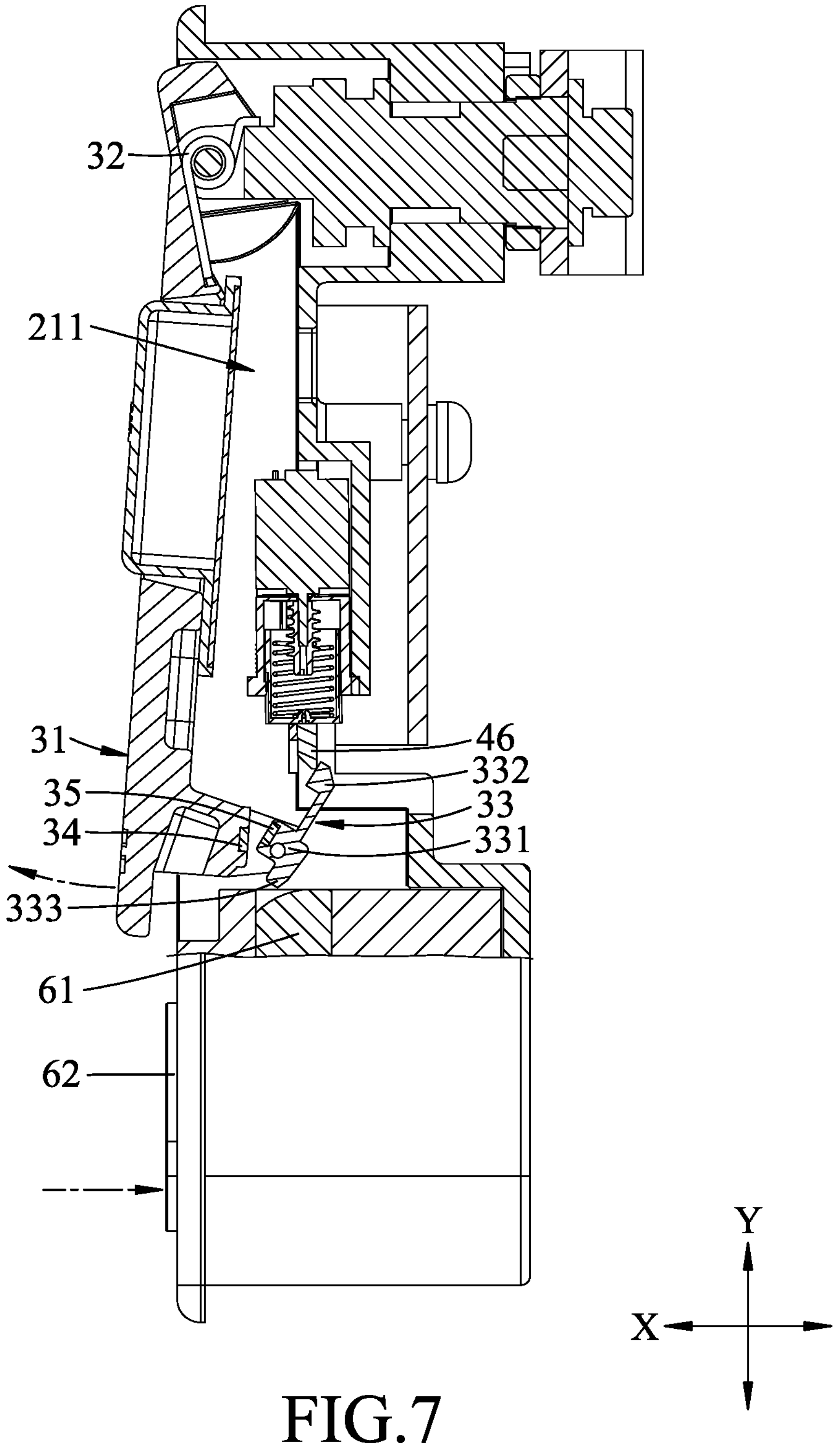
FIG. 7 is a partly-sectional view illustrating the embodiment during a mechanically unlocking operation.

With reference to FIGS. 2 and 7, when the electronic cabinet lock 1 is unlocked using a key, the operator inserts the key into the key hole 621 and rotates it to unlock the key cylinder 62. Subsequently, the key cylinder 62 is pressed rearwardly to move the lock tongue 61 downwardly such that the lower arm portion 333 is disengaged from the lock tongue 61. At this stage, the handgrip 31 is rotated forwardly by virtue of the biasing action of the torsion spring 32 to be removed from the accommodation slot 211. During the forward rotation of the handgrip 31 from the accommodation slot 211, the upper arm portion 332 of the swingable member 33 is retained by the latch member 46 to permit the lower arm portion 333 to swing forwardly until the upper arm portion 332 is disengaged from the latch member 46. Subsequently, with the magnetic attraction of the second magnet member 35 on the pivot portion 331 with the first magnet member 34, the lower arm portion 333 is swung rearwardly back to its original position.

Normally, the electronic cabinet lock 1 is unlocked using an electronic locking system. Once the electronic locking system is not working in an abnormal situation such as a power failure occurs or the clutch unit 4 is in failure function, the unlocking operation of the key cylinder 62 is performed through a key to open the door panel.

Figure 8:
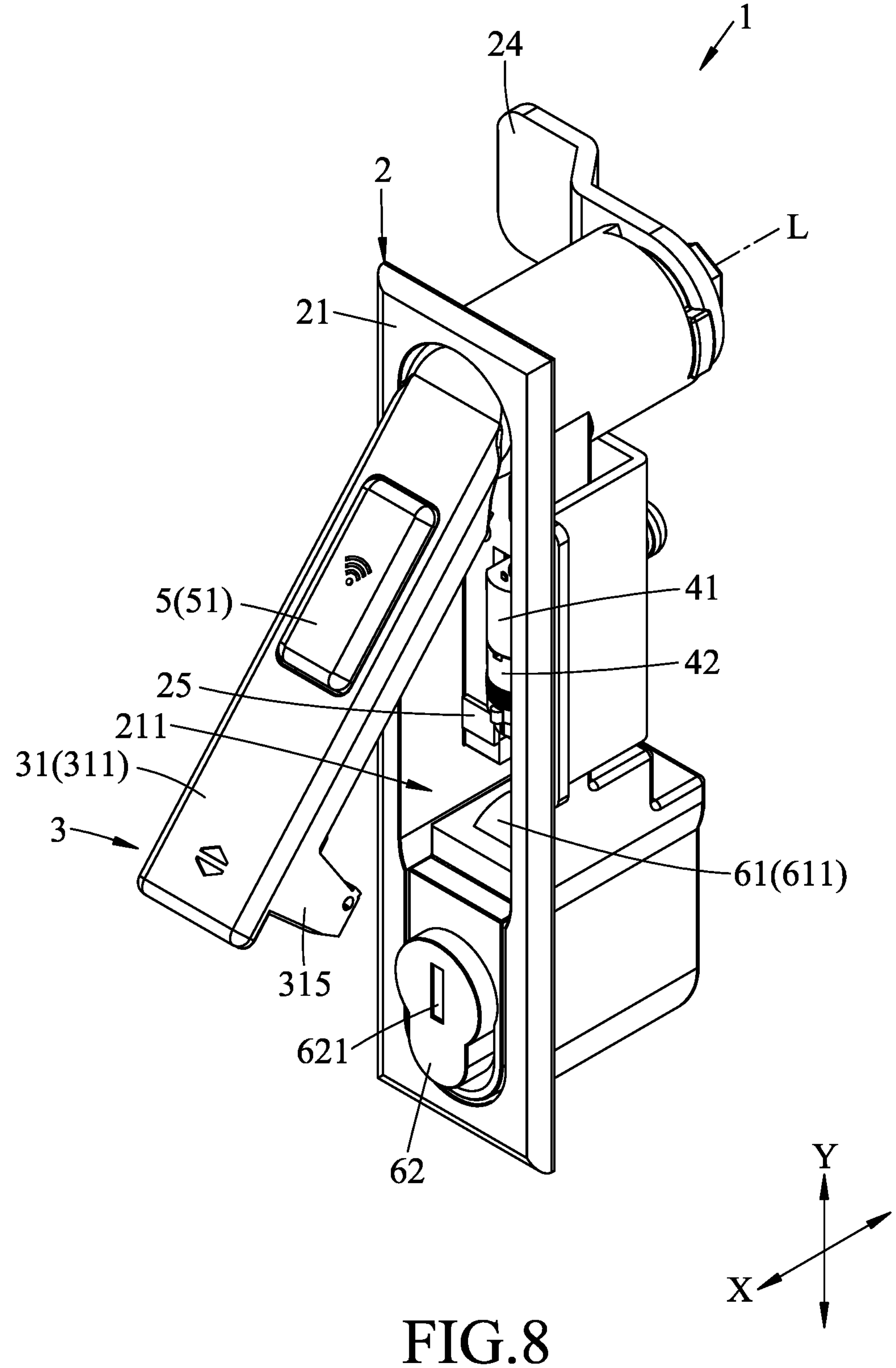
FIG. 8 is a perspective view illustrating the embodiment in an unlocking state.
Figure 9:
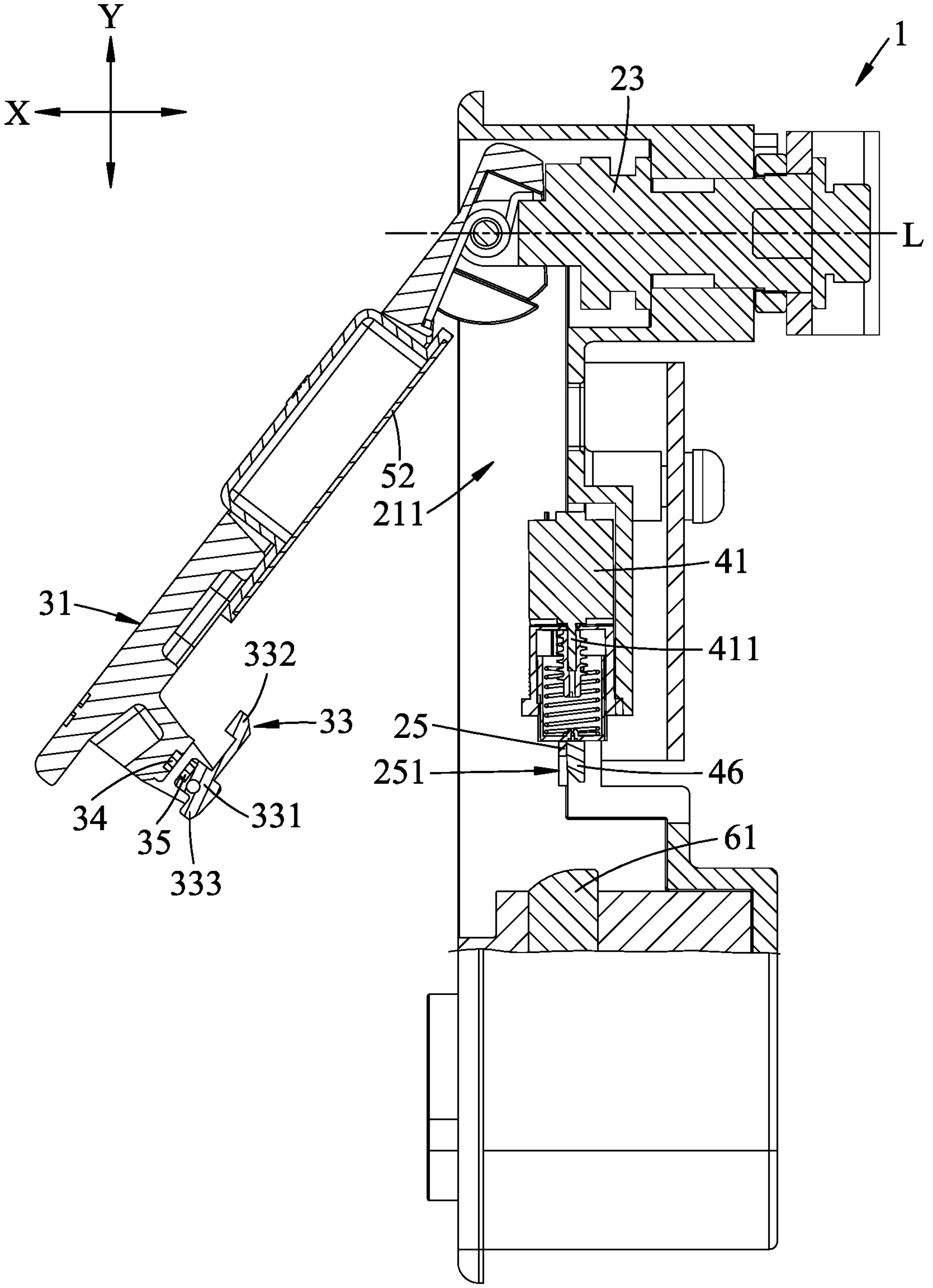
FIG. 9 is a partly-sectional view illustrating the embodiment in the unlocking state.

With reference to FIGS. 8 and 9, in the unlocking state, the handgrip 31 is remote from the accommodation slot 211. The handgrip 31 can be rotated about the rotating axis (L) by the operator to synchronously rotate the rotating axle 23 and the locking plate 24 such that the locking plate 24 is disengaged from the cabinet to permit an opening operation of the door panel. When the electronic cabinet lock 1 is unlocked using an electronic locking system, the clockwise rotation of the output shaft 411 of the driver 41 is controlled by the circuit board 52 to move the latch member 46 upwardly, and the counterclockwise rotation of the output shaft 411 is controlled and actuated automatically by the circuit board 52 to move the latch member 46 downwardly after a preset time. Thus, when the electronic cabinet lock 1 is shifted to the unlocking state and is held for a preset time, the latch member 46 is moved downwardly to the lower position as in the locking state.

It is mentioned that, when an electronic locking system is used to control and actuate the clockwise rotation of the output shaft 411 to move the latch member 46 upwardly, since the latch member 46 is tightly disposed between the press plate 25 and the upper arm portion 332, the operator can slightly press the handgrip 31 to slightly move the swingable member 33 rearwardly to facilitate the upward movement of the latch member 46 so as to permit the handgrip 31 to be rotated forwardly and be removed from the accommodation slot 211. With such a fool proof design, an undesired removal of the handgrip 31 from the accommodation slot 211 can be prevented if a mis-unlocking command is emitted by remote wireless communication. Also, with the circuit board 52 which controls and actuates the clockwise rotation of the output shaft 411 and counterclockwise rotation of the output shaft 411 thereafter a preset time, the latch member 46 in the upper position will be moved downwardly to keep abutment against the upper arm portion 332 so as to place the electronic cabinet lock 1 in the locking state.

Figure 10:
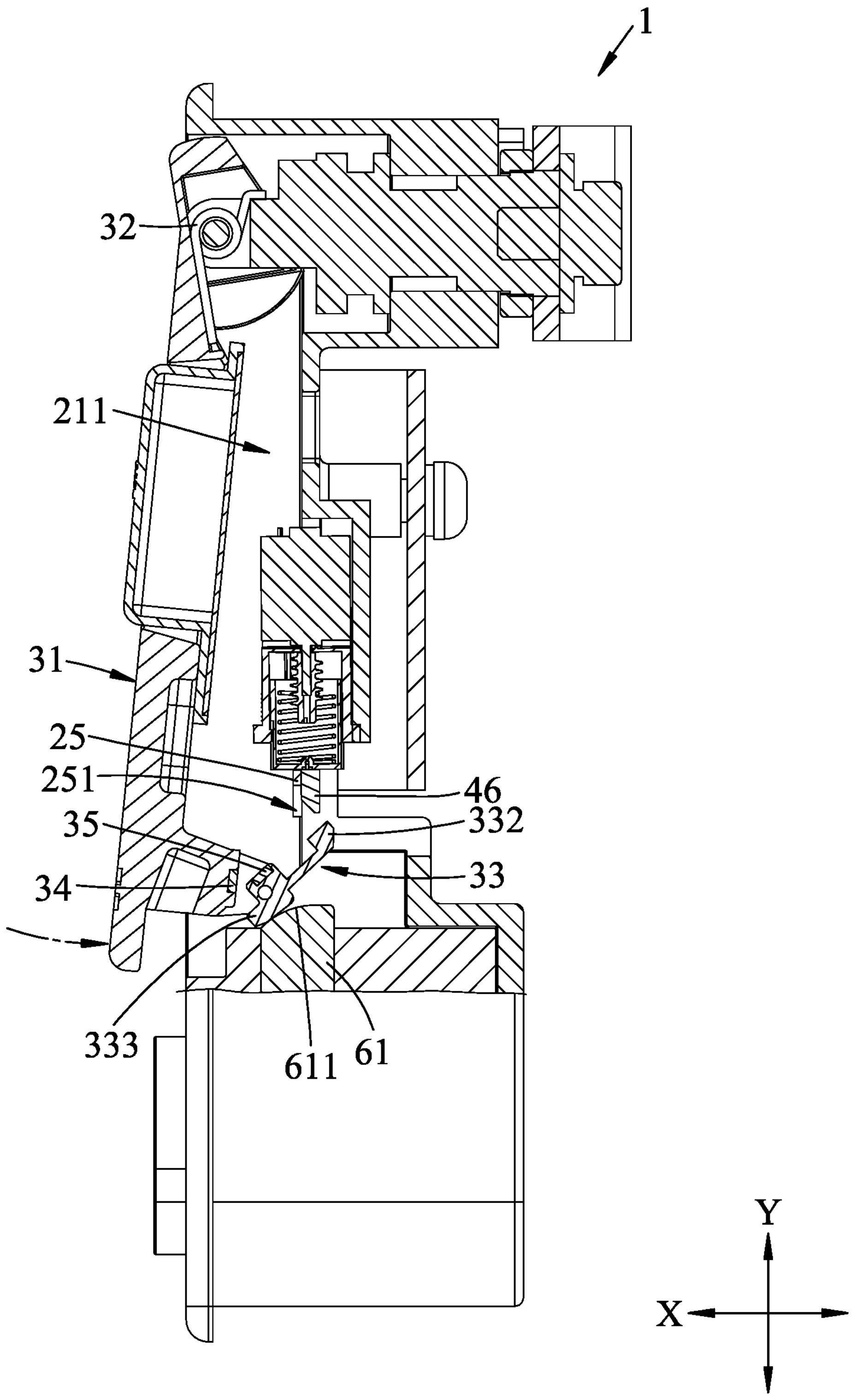
FIG. 10 is a partly-sectional view illustrating the embodiment during a locking operation.

With reference to FIG. 10, when it is desired to shift the electronic cabinet lock 1 from the unlocking state to the locking state, the handgrip 31 is pressed rearwardly against the torsion spring 32 to be received in the accommodation slot 211. During the rearward movement of the handgrip 31, the lower arm portion 333 of the swingable member 33 abuts against the third inclined surface 611 of the lock tongue 61 to bring the upper arm portion 332 to swing rearwardly and pass through the notch 251, until the lower arm portion 333 is moved over the third inclined surface 611. Subsequently, with the magnetic attraction of the second magnet member 35 with the first magnet member 34, the upper arm portion 332 is swung forwardly back to its original position so as to abut against the rear side of the latch member 46 (as shown in FIG. 4). At the same time, the lower arm portion 333 abuts against the rear side of the lock tongue 61 to place the electronic cabinet lock 1 in the locking state. During the rearward movement of the lower arm portion 333 over the third inclined surface 611, the lower arm portion 333 abuts against the third inclined surface 611 to generate an urging force that moves the lock tongue 61 downwardly. The lock tongue 61 is returned upwardly when the lower arm portion 333 passes over the third inclined surface 611.

During the rearward movement of the handgrip 31, when the lower arm portion 333 of the swingable member 33 abuts against the third inclined surface 611 while the upper arm portion 332 passes through the notch 251 of the press plate 25, the upper arm portion 332 may contact the latch member 46. With the first inclined surface 335 of the upper arm portion 332 and the second inclined surface 461 of the latch member 46, an urging force is generated to slightly and upwardly move the latch member 46 so that the upper arm portion 332 is kept swinging rearwardly. Once the latch member 46 is slightly and upwardly moved, the inner tubular wall 43 is moved upwardly to compress the biasing member 45 until the upper arm portion 332 is disengaged from the latch member 46. The inner tubular wall 43 is biased downwardly by the biasing member 45 to move the latch member 46 back to the lower position.

It is noted that, whether the electronic cabinet lock 1 is unlocked using an electronic or a mechanical unlocking manner, it is locked through the above-mentioned locking operation. The locking operation may be conducted with only one hand of the operator. When it is desired to perform the locking operation after the mechanical unlocking where the key cylinder 62 is unlocked, the operation of locking the key cylinder 62 can be performed firstly before the above-mentioned locking operation, and vice versa. Since, the locking operation can be performed with one hand of the operator, the electronic cabinet lock is quite convenient to operate.

As illustrated, with the second magnet member 35 disposed in the pivot portion 331 of the swingable member 33 and magnetically attracted to the first magnet member 34 disposed on the central portion 314 of the handgrip 31, in any one of the electronically unlocking, mechanically unlocking and locking operations, during swinging of the swingable member 33 where the swingable member 33 is in abutting engagement with the latch member 46 or the lock tongue 61, the swingable member 33 can be moved back to its original position so as to render the swingable member 33 well functioning after long term use. Moreover, in the locking operation, the operator presses the handgrip 31 to the accommodation slot 211 with one hand to bring the upper arm portion 332 in abutting engagement with the rear side of the latch member 46 and bring the lower arm portion 333 in abutting engagement with the rear side of the lock tongue 61, which is convenient to conduct.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An electronic cabinet lock comprising:

a housing unit including a mounting housing which has an accommodation slot, and a rotating axle which is rotatably mounted on said mounting housing;

a handle unit including a handgrip which has an end that is pivotably connected with said rotating axle and which is removably disposed in said accommodation slot, a torsion spring which is disposed between said handgrip and said rotating axle, a swingable member which is swingably disposed on an opposite end of said handgrip that is opposite to said rotating axle, a first magnet member which is disposed on said opposite end of said handgrip adjacent to said swingable member, and a second magnet member which is disposed on said swingable member and which is constantly attracted to said first magnet member, said torsion spring being disposed to bias said handgrip away from said accommodation slot, said swingable member having an upper end and a lower end opposite to each other in an up-down direction;

a clutch unit disposed within said mounting housing, and including a latch member which is actuated to move in the up-down direction, said latch member being disposed forwardly of said upper end of said swingable member in a front-rear direction that is transverse to the up-down direction to abut against said upper end of said swingable member when said latch member is in a lower position;

a control unit disposed on said handgrip and operable to control movement of said latch member in the up-down direction; and a lock cylinder unit disposed in said accommodation slot and below said handgrip, said lock cylinder unit including a lock tongue which is movable in the up-down direction, and a key cylinder which is operable to move said lock tongue in the up-down direction, said lock tongue being disposed forwardly of said lower end of said swingable member to abut against said lower end of said swingable member when said lock tongue is in an upper position, said key cylinder having a key hole.

2. The electronic cabinet lock of claim 1, wherein said swingable member has a pivot portion which is pivotably connected with said handgrip about a pivot axis in the front-rear direction and on which said second magnet member is disposed, an upper arm portion which extends upwardly from said pivot portion to have said upper end, and a lower arm portion which extends downwardly from said pivot portion to have said lower end such that said upper arm portion and said lower arm portion are swingable relative to said handgrip about the pivot axis.

3. The electronic cabinet lock of claim 2, wherein said housing unit includes a press plate which is disposed within said mounting housing and forwardly of said latch member to permit abutment of said latch member thereagainst when said latch member is in the lower position, said press plate having a notch which is opened downwardly for passing of said upper arm portion of said swingable member during swinging of said upper arm portion.

4. The electronic cabinet lock of claim 2, wherein said handgrip has a handgrip plate which is said end pivotably connected with said rotating axle and which extends in the up-down direction, and a protrusion which extends rearwardly from said opposite end away from said rotating axle, said protrusion having a central portion on which said first magnet member is disposed, and two lugs which protrude rearwardly from both sides of said central portion, said pivot portion being interposed between and pivotably connected with said lugs.

5. The electronic cabinet lock of claim 4, wherein said central portion has a first mounting slot which is opened rearwardly and in which said first magnet member is embedded, said pivot portion having a second mounting slot which is opened toward and faces said first mounting slot and in which said second magnet member is embedded.

6. The electronic cabinet lock of claim 4, wherein said handgrip has a penetrating slot which extends therethrough in the front-rear direction, said control unit including an inductive sensor member which is disposed in said penetrating slot, and a circuit board which is electrically connected with said inductive sensor member to control the movement of said latch member in the up-down direction.

7. The electronic cabinet lock of claim 2, wherein said upper arm portion of said swingable member has a first inclined surface which is formed at a rear side thereof and which is inclined relative to the up-down direction, said latch member having a second inclined surface which is formed at a front side thereof, which is inclined relative to the up-down direction and which faces and which abuts against said first inclined surface during swinging of said upper arm portion to generate an urging force that moves said latch member upwardly to permit rearward swinging of said upper arm portion.

8. The electronic cabinet lock of claim 7, wherein said lock tongue has a third inclined surface which is formed at a front side thereof and which is inclined relative to the up-down direction such that said lower arm portion abuts against said third inclined surface during swinging of said lower arm portion to generate an urging force that moves said lock tongue downwardly to permit rearward swinging of said lower arm portion.

9. The electronic cabinet lock of claim 1, wherein said clutch unit includes a driver which is disposed within said mounting housing and which is controlled and actuated by said control unit, an outer tubular wall which is disposed below said driver, an inner tubular wall which is slidably disposed within said outer tubular wall in the up-down direction, a bottom wall which is disposed on a bottom end of said inner tubular wall, a worm gear which is disposed within said inner tubular wall and which is actuated by and rotated with said driver, and a biasing member which is connected between said bottom wall and said worm gear, said latch member being connected with and extending downwardly from said bottom wall to be moved with said inner tubular wall in the up-down direction.

10. The electronic cabinet lock of claim 9, wherein said driver is in form of a motor, and has an output shaft, said worm gear being coupled and rotated with said output shaft and having a shaft portion which is engaged with said output shaft, and a thread portion which is formed around said shaft portion, said biasing member being in form of a coil spring and having an upper spring end which is slidably disposed on said thread portion, and a lower spring end which is securely disposed on said bottom wall.

* * * * *